Patented Apr. 7, 1936

2,036,423

UNITED STATES PATENT OFFICE 2,036,423

SULPHONIC ACID ESTERS OF CELLULOSE DERIVATIVES AND THE PREPARATION THEREOF

Carl J. Malm and Gale F. Nadeau, Rochester, N. Y., assignors to Eastman Kodak Company, Rochester, N. Y., a corporation of New York No Drawing. Application April 27, 1932, Serial No. 607,887

8 Claims. (Cl. 260—101)

The present invention relates to the preparation of sulphonic acid esters of cellulose derivatives by treating an ester, ether or ether-ester of cellulose with an aryl or alkyl sulpho-halide in the presence of an organic base.

The steadily increasing technical demand for cellulose esters, which find numerous applications in the various arts, has resulted in the production of a large number and variety of compounds of cellulose esterified with the radicals of both the organic and the inorganic acids. Various sulphur-containing derivatives of cellulose are known to have been prepared, such as the so-called cellulose sulphuric acid esters, but every indication points to the fact that these substances, are esters of a much degraded cellulose. This view is supported by the fact that solutions of such esters exhibit strong optical polarization and also by the fact that these esters form water-soluble barium salts.

Sulphur-containing cellulose derivatives of other kinds have been described in the prior art but they have not been satisfactory for one reason or another for commercial use and oftentimes needed modification to procure materials having utility, probably due to the degraded nature of the derivative formed by the processes heretofore employed. For instance, cellulose has been treated with sodium hydroxide to form an alkali cellulose, which material was treated with benzene-sulpho-chloride and then acetylated in the usual manner. The resulting product was then treated with aniline to form an amino-cellulose derivative. Obviously due to the severe treatment of the cellulose originally, the final product will be the derivative of a much degraded cellulose, such as a polysaccharide.

Alkali soluble cellulose, dissolved in alkali has previously been treated with a sulphur chloride such as p-toluene sulphochloride to form a sulphonic acid ester of cellulose; however, in that process a rather badly degraded cellulose is employed as the starting material and the final product which results, when formed into a skin or sheet, is very brittle.

One object of our invention is to provide a process for the preparation of sulphonic acid esters of cellulose which does not degrade the cellulose. Another object of our invention is to provide sulphonic acid esters of cellulose which have a wide solubility range and which are exceptionally stable towards alkali, are moisture resistant and have a lower burning rate than the known aliphatic acid esters of cellulose.

We have found that esters of cellulose containing a sulphonic acid group may be prepared by treating a cellulose derivative, containing free and available hydroxyl groups, with an aryl or alkyl sulpho-halide in the presence of an organic base such as pyridine. We have found that the preparation of esters of cellulose containing sulphonic acid groups by this process results in no apparent degradation of the cellulose. Thus, the resulting product of our process is a derivative of cellulose proper and not that of a cellobiose or some other conversion product of cellulose.

We have found that esters of cellulose containing a sulphonic acid group may be prepared by our process without employing an alkali-treated or other degraded variety of cellulose as the starting material. We have found that to the esters or ethers of cellulose containing free and available hydroxyl groups there may be added a sulphonic acid group to form a substantially fully esterified mixed ester or ether-ester of cellulose.

The following examples are illustrative of specific embodiments of our invention:

Example I 10 lbs. of cellulose acetate having an acetyl content of 34% was dissolved in 40 lbs. of pyridine. 20 lbs. of p-toluene sulphochloride was added to the solution and the whole was heated to 50–55° C. at which temperature it was maintained for 24 hours. The product formed was isolated from the bath by pouring the reaction mixture into a precipitating liquid such as methyl alcohol. The starting material employed was insoluble in all the common organic solvents except pyridine, and like bases, while the product obtained by this reaction was soluble in acetone, methyl acetate, ethyl acetate, ethylene chloride, chloroform, tetrachlorethane, 1:4 dioxan, etc. It was also soluble in solvent mixtures such as methyl alcohol and acetone (3:1), benzene and methyl alcohol (1:1), toluene and methyl alcohol (1:1) etc. Analysis of the product disclosed that is corresponds approximately to a cellulose diacetate mono p-toluene sulphonate.

The precipitation value of the starting material was zero, while the product of the above example had a precipitation value of 95%. The precipitation value of a cellulose ester is that percentage of the ester, which from an acetone solution thereof, will precipitate in a mixture of 40% by volume of water and 60% by volume of acetone. The method employed to determine this precipitation value is as follows:

5 grams of the dry ester of cellulose is accurately weighed and placed in a wide mouth 12 oz. bottle.

To this ester is added 100 cc. of acetone (commercial grade of at least 99%) and the mixture should be stirred until a homogeneous solution is formed. (The bottle should be closed during the stirring with a rubber stopper fitted with a shaft for the stirrer.) To this dope is added slowly from a pipette and with thorough stirring, 150 cc. of a mixture consisting of 2 parts of distilled water and 1 part of acetone by volume. Care should be taken to keep the solvents and mixtures at 20° C. wherever volumes are measured.

At the end of the addition of the acetone-water mixture, a mixture is obtained containing 40% water by volume (neglecting contraction) in which is suspended the precipitated acetate. This is allowed to stand for 12 hours at 20° C. At the end of this time precipitation has reached equilibrium and proceeds no further and during the same time settling of the precipitate occurs. 25 cc. of the clearest portion (supernatant solution) is removed with a pipette and centrifuged in a stoppered bottle at high speed until the liquid is perfectly clear. Exactly 5 cc. of the clear liquid are removed with a pipette and evaporated to dryness on a tared watch glass. If W is the weight of the residue in grams the percentage of the ester precipitated is calculated by the formula:

$$\text{Precipitation value} = 100 - W \times \frac{250}{5} \times \frac{1}{5} \times 100$$
$$= 100 - 1000W$$

Example II

The proportions and conditions were the same as in the previous example except that only 30 lbs. of pyridine was employed and 10 lbs. of acetone was added in the bath. The product obtained has the same solubilities as the product obtained in the previous example.

Example III

The proportions and conditions were the same as in Example I except that 20 lbs. of benzene sulphochloride was substituted for the p-toluene sulphochloride employed in that example. A cellulose acetate benzene sulphonate was formed and it was found to have the same solubilities as the cellulose acetate p-toluene sulphonate prepared in Example I.

Example IV 20 lbs. of celulose acetate having an acetyl content of 34% was dissolved in 120 lbs. of pyridine. 40 lbs. of p-bromobenzenesulphonyl chloride was added to this solution which was then heated up to and maintained at a temperature of 50–55° C. for 20 hours. The product was isolated by precipitation and washing with methyl alcohol. A cellulose diacetate mono-p-bromobenzene sulphonate was obtained. It was soluble in acetone, methyl acetate, ethyl acetate, ethyl lactate, ethylene chloride, chloroform, tetrachlorethane, 1:4 dioxan, ethylene glycol monoacetate and B B'dichlorethyl ether.

Example V 10 lbs. of a cellulose acetate propionate having a 17% propionyl content and a 26% acetyl content was dissolved in 40 lbs. of pyridine. 10 lbs. of p-toluene sulphonyl chloride was added to the solution which was then heated up to and maintained at a temperature of 50–55° C. for 18 hours. The product formed was precipitated and washed with methyl alcohol and upon analysis was found to contain 21.5% acetyl, 15% propionyl and 17.5% of p-toluene sulphonyl groups. The cellulose acetate propionate para-toluene sulphonate was found to be soluble in acetone, methyl acetate, ethyl acetate, butyl acetate, ethylene chloride, chloroform, and propylene chloride.

The wide solubility range of the esters of cellulose prepared according to the process of our invention together with their other properties such as their exceptional stability toward alkalies, their resistance to moisture and their low burning rate suggest many uses for these compounds. They may be employed for the making of skins or sheets, artificial silk, artificial leather, molding compounds, lacquers or any of the other uses to which organic acid esters of cellulose are applied at the present time. For example there is the danger of inflammability in motion picture projection and the less inflammable a film is, the more ideal it is for that purpose, other things being equal, so that our less inflammable esters give promise of much value in that art.

Various plastic materials such as cellulose nitrate, cellulose acetate, cellulose mixed esters such as the acetate-propionate, resins, gums or waxes may, where compatible, be incorporated with the sulphonic acid esters of cellulose produced according to our process.

Skins of our new esters also exhibit a flexibility which compares favorably with that exhibited by skins of ordinary cellulose acetate. A skin of cellulose acetate p-toluene suphonate was coated out from ethylene chloride and exhibited a fold-tolerance of 5 folds when tested on a Schopper film tester which is the method commonly employed to determine the flexibility of a film. A skin of cellulose acetate benzene sulphonate coated from ethylene chloride gave a fold-tolerance of 6 folds while a cellulose acetate skin coated out from acetone exhibited a fold-tolerance of 5 folds. If desired, of course, the esters prepared according to our process may be plasticized by any suitable material such as for instance a material which is commonly known as a plasticizer for cellulose acetate.

As was pointed out above, cellulose ethers such as ethyl cellulose or cellulose ether-esters such as ethyl cellulose acetate which have free and esterifiable hydroxyl groups, may be employed as the starting material of our process. In our process various organic bases besides pyridine such as alpha-picoline or quinoline may be employed. Also other organic bases such as dialkyl anilines, hexahydro-dialkyl anilines, dimethyl n-hexylamine, isoamyl diethyl amine etc. would suggest themselves to those skilled in the art as a group which would supply organic bases suitable for employment as the catalyst in the present invention. Although the sulphonyl chlorides are the most commonly known and the more economical of the sulphonyl halides of the present time, our invention embraces the employment of sulphonyl halides in general including the bromides and iodides.

The aromatic sulphochlorides are better known than the alkyl sulphochlorides and will be employed as a rule when an organic sulphochloride is required, however, in the present process, if one desires he may employ an alkyl sulphochloride instead of the preferred aryl variety.

Various other modifications of our invention are apparent to those skilled in the art and also come within the scope of our invention.

We claim as our invention:
1. The preparation of a cellulose derivative containing a sulphonic acid radical which com- prises reacting upon an undegraded cellulose derivative containing esterifiable hydroxyl groups with an aryl sulphohalide in the presence of an organic base selected from the group consisting of pyridine, alpha-picoline and quinoline.

2. The preparation of a cellulose derivative containing a sulphonic acid radical which comprises reacting upon an undegraded cellulose derivative containing esterifiable hydroxyl groups with an organic sulphohalide in the presence of pyridine.

3. The preparation of a cellulose derivative containing a sulphonic acid radical which comprises reacting upon an undegraded cellulose derivative containing esterifiable hydroxyl groups with an aryl sulphochloride in the presence of pyridine.

4. The preparation of an ester of cellulose containing a sulphonic acid radical which comprises reacting upon an undegraded incompletely esterified cellulose acetate with an organic sulphohalide in the presence of an organic base selected from the group consisting of pyridine, alpha-picoline and quinoline.

5. The preparation of an ester of cellulose containing a sulphonic acid radical which comprises reacting upon an undegraded incompletely esterified cellulose acetate with an organic sulphohalide in the presence of pyridine.

6. The preparation of an ester of cellulose containing a sulphonic acid radical which comprises reacting upon an undegraded incompletely esterified cellulose acetate with an aryl sulphohalide in the presence of an organic base selected from the group consisting of pyridine, alpha-picoline and quinoline.

7. The preparation of an ester of celulose containing a sulphonic acid radical which comprises reacting upon an undegraded incompletely esterified cellulose acetate with para-toluene-sulphochloride in the presence of an organic base selected from the group consisting of pyridine, alpha-picoline and quinoline.

8. The preparation of a cellulose derivative containing a sulphonic acid radical which comprises reacting upon an undegraded cellulose derivative containing esterifiable hydroxyl groups with an organic sulphohalide in the presence of an organic base selected from the group consisting of pyridine, alpha-picoline and quinoline.

CARL J. MALM.
GALE F. NADEAU.

DISCLAIMER 2,036,423.—*Carl J. Malm* and *Gale F. Nadeau*, Rochester, N. Y. SULPHONIC ACID ESTERS OF CELLULOSE DERIVATIVES AND THE PREPARATION THEREOF. Patent dated April 7, 1936. Disclaimer filed May 5, 1938, by the assignee, *Eastman Kodak Company*.

Hereby enters this disclaimer to claims 1, 2, 3, and 8 of said Letters Patent.
[*Official Gazette May 31, 1938.*]